United States Patent [19]

Policansky

[11] 3,997,130

[45] Dec. 14, 1976

[54] FISHING REELS

[76] Inventor: Hyman Policansky, P.O. Box 1154, Cape Town, South Africa

[22] Filed: Feb. 4, 1975

[21] Appl. No.: 547,026

[30] Foreign Application Priority Data

Feb. 7, 1974 United Kingdom ............... 5762/74

[52] U.S. Cl. ................................ 242/211; 242/217

[51] Int. Cl.[2] ........................................ A01K 89/00

[58] Field of Search ........... 242/218, 217, 220, 211

[56] References Cited

FOREIGN PATENTS OR APPLICATIONS 1,333,432 10/1973 United Kingdom ............... 242/218

*Primary Examiner*—Richard E. Aegerter
*Assistant Examiner*—L. Footland
*Attorney, Agent, or Firm*—Brisebois & Kruger

[57] ABSTRACT

A game fishing reel of the multiplying type has a spool for fishing line rotatably mounted on a shaft supported between two end housings moulded from thermosetting plastic. A winding handle is mounted on one of the end housings and is arranged to rotate the spool through a friction coupling which comprises one coupling part, to which the winding handle is geared, rotatably mounted on the shaft in opposing relation to a friction ring secured to the adjacent end flange of the spool. The shaft is rotatable in the end housings and at the end housing remote from the winding handle it is journalled in an aperture formed through the plastic material of this end housing and projects on the outside of the housing. The projecting end of the shaft is threaded and has a nut screwed thereon into abutting relation with the outside of the end housing. The spool abuts the inside of the latter through a thrust bearing whilst the said one coupling part abuts another thrust bearing secured to the shaft adjacent its opposite end. Hand operated means are coupled to the shaft and nut for selectively turning these so as axially to adjust the shaft and vary the coupling pressure of the friction coupling.

6 Claims, 3 Drawing Figures

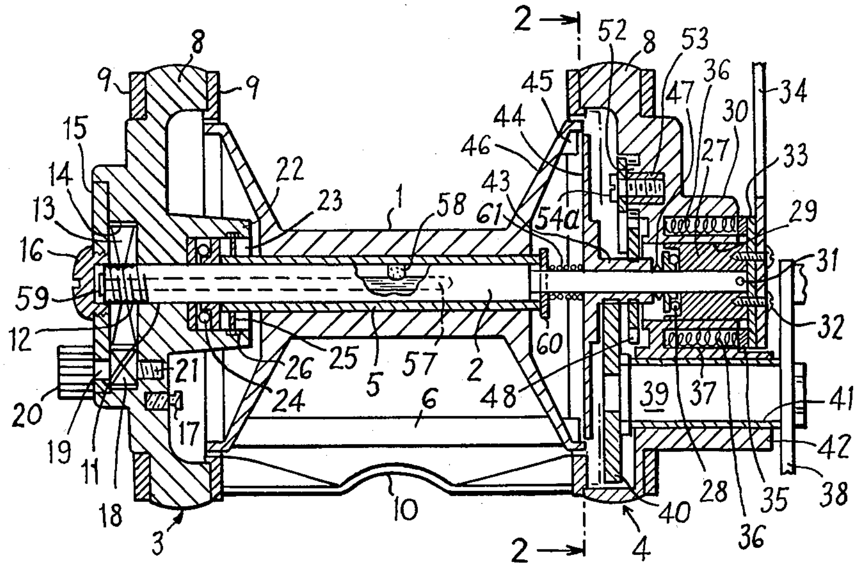
Fig.1
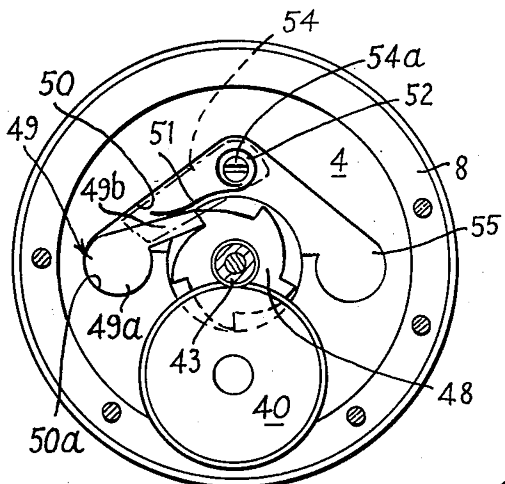
Fig.2
Fig.3
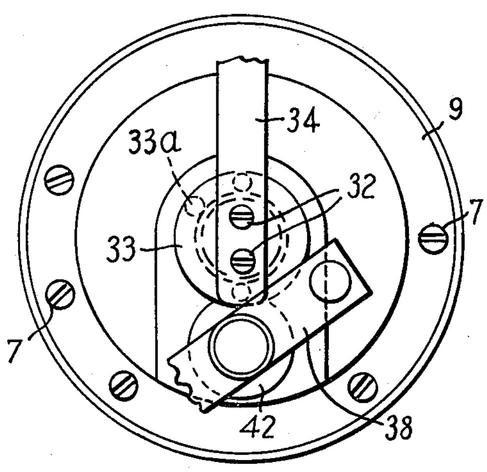

FISHING REELS

BACKGROUND OF THE INVENTION

The present invention relates to fishing reels of the multiplying type which are primarily intended for game fishing and which incorporate a braking mechanism for applying drag to the fishing line when it is being pulled-off the reel by a fish.

My United Kingdom Pat. No. 1,333,432 describes and claims a fishing reel of the multiplying type, comprising a spool rotatable on a shaft supported between two end housings, said shaft having a screw thread at one end screwed into a nut or other internally threaded bush supported in the adjacent end housing, means for turning the shaft and bush relative to one another so as to effect relative axial adjustment thereof by means of the screw thread connection therebetween, and a winding handle mounted on one of the end housings and arranged to rotate the spool through a friction coupling which comprises one coupling part, to which the winding handle is geared, rotatably mounted on the shaft in opposing relation to a second coupling part connected to the spool, said coupling parts being axially adjustable relative to one another in response to relative axial adjustment of the shaft and bush.

In a preferred form of the reel disclosed in the aforementioned patent, the shaft is mounted so as also to be axially movable whilst the nut is only rotatably mounted in its end housing and serves to support the end of the shaft in that end housing. At its end opposite the nut or bush, the shaft is supported in the adjacent end housing by means of a barrel, embodying a thrust bearing, to which it is secured and which is slidably and rotatbly supported in a bearing in the adjacent end housing. At this end, the shaft is provided with a lever or other handle means for turning the shaft relative to the nut in order to effect axial adjustment of the parts of the friction coupling. Rotatably mounted in the end housing adjacent the nut is a manually rotatable spindle having a pinion meshing with a gear member secured to the nut. The spindle may be rotated by a knob on the outside of the end housing and this knob is normally used to set the free-spool position (that is the position in which the friction coupling is disengaged) of the range over which the friction coupling pressure can be quickly varied by the lever attached to the shaft.

The winding handle is geared to the said one coupling part of the friction coupling by a gear wheel which is driven by the winding handle and meshes with a pinion rotatably mounted on the shaft and is fixed to said one coupling part. A pawl and ratchet device prevents the said one coupling part from rotating in the unwinding direction of the spool so that said one coupling part applies a braking force to the spool and drag to the fishing line when it is being pulled-off the reel by a fish. The amount of drag applied is adjustable primarily by means of the lever. However, the knob may be used to increase the braking pressure above that produced merely by moving the lever to its full braking position, if this should prove necessary or desirable during playing of a fish.

Whilst the reel described in my United Kingdom Pat. No. 1,333,432 works extremely satisfactorily in practice, it is unduly complicated.

SUMMARY OF THE INVENTION

The object of the present invention is to improve the performance of the above described reel and reduce its cost of manufacture. This is achieved, according to one aspect of the present invention, by moulding the end housings or end plates from plastics material, preferably, thermosetting plastics material, whereby one or more parts of the reel may be formed integrally with the end housings so as to reduce the number of individually machined parts and provide design improvements to the end housings.

According to another aspect of the present invention, the end housing adjacent the nut or other internally threaded bush is formed with a bearing aperture for supporting the shaft adjacent its threaded end, the latter projecting through the aperture and having the nut simply screwed onto its threaded end on the outside of the bearing aperture. The nut may be housed in a recess formed on the outside of the end housing and the recess may be closed by a cover plate so that the nut is completely enclosed. To permit setting of the free-spool position, or other adjustment of the range over which the friction coupling pressure can be quickly varied by the lever or handle attached to the shaft, the nut may be arranged to be turned relative to the shaft by means of a pinion operated by a knob and meshing with gear teeth formed about the periphery of the nut.

Conveniently, an inwardly projecting annular boss is moulded on the inside of the end housing supporting the threaded end of the shaft so as to surround the shaft and provide a housing for a thrust bearing which serves as one of the abutments for applying the friction coupling pressure. The open end of the boss may be sealed by an annular seal so as to protect the thrust bearing.

One advantage of supporting the shaft directly in a moulded end housing is that this eliminates the necessary tolerance between the threaded nut or bush and the end housing of the reel disclosed in my prior application United Kingdom Pat. No. 1,333,432, enabling the annular gap between the spool flange, or end housing ring, to be reduced. The reduction in this gap minimises the possibility of line entering the gap and becoming snagged.

According to yet another aspect of the invention, a performance advantage is achieved by the use of one or more springs conveniently housed in suitable cavities in a moulded end housing and bearing against a portion of the brake control lever concentric with the shaft, the springs constantly urging the shaft and its attached thrust bearing, which serves as the second abutment, in the desired direction away from the nut, thereby eliminating backlash in the screw engagement of the nut and shaft. This is important in a mechanism the total axial movement of which between the full on and the full off positions is in the order of twelve thousandths of an inch. In addition the springs offer a simple means of holding the control lever in the free spool position by suitably dimpling the control lever.

Furthermore, in previous models using a friction ring round the barrel of the thrust bearing attached to the spool shaft, it has been found that when excessive wear of the friction ring causes it to loose its frictional grip on the bearing barrel there is a tendency, particularly when casting, for the control lever to move and apply braking pressure on the spool, which is clearly undesirable. According to the present invention, the use of one or more springs to provide frictional resistance to rotary movement of the brake control lever and also the use of one or more springs (suitably capped) to engage a dimple or dimples formed in the brake control lever flange for holding purposes, completely overcomes this problem.

According to a further aspect of the present invention, the bearing or journal for supporting the end of the shaft opposite its threaded end is formed integrally with the adjacent end housing. Both this bearing and the bearing aperture for the threaded end of the shaft do not require bearing surfaces made from a more durable material than the plastics used for moulding the end housings since these bearings are not required to withstand other than partial and occasional manual rotation of the shaft.

According to a still further aspect of the invention, one of the end housings is also moulded with a bearing bushing or housing for a bearing sleeve for the spindle of the winding handle.

Other aspects, objects and advantages of the invention will be apparent from the following description, the accompanying drawings and appended claims.

BRIEF DESCRIPTION OF THE DRAWINGS

FIG. 1 is an axial section through a fishing reel embodying the present invention, FIG. 2 is a section along the line 2—2 of FIG. 1, and FIG. 3 is an end view of the right-hand end of the reel as viewed in FIG. 1.

DESCRIPTION OF THE PREFERRED EMBODIMENT

Referring to the drawings, the fishing reel comprises a spool 1 rotatably mounted on a shaft 2 supported between two end housings 3, 4. The spool is provided with a bush 5 which rotates in contact with the shaft 2. The end housings, which are moulded from a suitable thermosetting plastics material, are spaced apart and connected together by stay bars 6 which are secured at opposite ends to the housings 3, 4 by screws 7. These screws extend through peripheral flanges 8 of the housings and screw into the adjacent ends of the stay bars. Metal rings 9 are provided on the insides and outsides of the peripheral flanges between the flanges and the heads of the screws and the ends of the stay bars and are retained in position by the screws. A reel seat 10 is secured between the end housings for enabling the reel to be attached to a fishing rod.

The left-hand end of the shaft 2 projects through the end housing 3 via a bearing aperture 11 which is disposed at the centre of this end housing and supports the adjacent end of the shaft. The projecting end of the shaft is formed with a screw thread 12 which screws into the threaded bore of a gear nut 13. The latter is housed in a recess 14 moulded in the outside of the end housing 3 and a cover plate 15 is secured over this recess by means of two screws (not shown) so that the gear nut is completely enclosed. A screw cap 16 in the centre of the cover plate provides access to the adjacent end of the shaft to permit lubrication of the screw threads and also the bearing surfaces between the bush 5 and the shaft 2, as will hereinafter be described.

To enable the gear nut 13 to be turned, the gear teeth on the periphery of the nut mesh with a pinion 18 secured to a small spindle 19 rotatably mounted in the cover plate 15 and having a manual knob 20 projecting on the outside of the cover plate. A small spring 21 disposed in a cylindrical cavity in the end housing inwardly of the pinion 18 bears on the pinion in order to exert a frictional force thereon and retain the pinion in its adjusted position.

Surrounding the shaft on the inside of the end housing 3 is an inwardly projecting annular boss 22 which is moulded integrally with the end housings. The annular space 23 between the boss 22 and the shaft serves to house a thrust ball bearing 24 constituting an abutment against which the spool bush 5 abuts. A plastic retaining washer 25 snaps into a groove 26 in the inner periphery of the annular boss 22 and engages the bush 5. This washer seves to retain the thrust bearing in position in the boss and also to protect the bearing against water.

17 is an anchor for one end of the spring which operates a "click" mechanism (not shown) which serves as a noise maker The right-hand end of the shaft 2 is secured to a barrel or bush part 27 of another thrust bearing 28 constituting an abutment fixed to the shaft. The bush part 27 is rotatably and slidably mounted in a bearing 29 disposed at the centre of the right hand end housing 4 and formed in a boss 30 moulded on the outside of this end housing. The shaft 2 projects through the bush part 27 and has a transverse pin 31 adjacent its outer end which engages in a transverse slot (not shown) in the outer end face of the bush part. Secured to the end face by means of screws 32 are a disc 33 and a radially projecting brake control lever 34. The disc and lever lock the pin 31 in engagement with the slot in the end face of the bush part. The disc 33 projects over the face of the boss 30 and, so as to restrain the lever from turning when not manually operated, the disc is acted on by two friction pads 35 which are urged into engagement with the under side of the disc by two springs 36 housed in bores 37 formed in the boss 30 at diametrically opposite positions of the bearing 29. In order positively to locate the full-off position of the friction coupling hereinafter described, the underside of the disc 33 may be provided at an appropriate position with a dimple 33*a* in which the friction pad or cap 35 of one of the springs 36 engages when the lever 34 is in the off position. The control lever 34 is in the off position when it almost touches the handle shaft housing 42.

The spool is rotatable by winding handle 38 fixed to the outer end of a spindle 39 which has a gear wheel 40 secured to its inner end. The spindle is journalled in a bearing sleeve 41 which is an interference fit in a cylindrical housing 42 formed in the boss 30 to one side of the bearing 29. The gear wheel 40 meshes with a pinion 43 which is rotatable on the shaft 2 and is integral with a disc 44 forming one part of a friction coupling, the other part of which is constituted by a ring 45 of friction material secured to the opposing face of the adjacent end flange 46 of the spool adjacent the periphery of the end flange. The disc 44 may be moved into and out of engagement with the ring 45 by screwing the shaft 2, relative to the gear nut 13, as will hereinafter be more fully described. When the shaft 2 axially moves in a direction to engage the friction coupling, the disc 44 is urged into contact with the friction ring 45 by the thrust bearing 28 which acts on the adjacent end of the pinion 43 through disc springs 47.

Disc 44 is prevented from rotating in one direction about the shaft 2 by a pawl and ratchet mechanism comprising a ratchet wheel 48 secured to the pinion 43 and a pawl 49 pivotally mounted in a recess 50 moulded on the inside of the end housing 4. The pawl is pivoted by having a cylindrical portion 49$a$ at one end seated in a complementarily shaped part 50$a$ of the recess 50. The pawl is urged into engagement with the ratchet wheel by a leaf spring 51 pressing on the nose 49$b$ of the pawl. This spring is mounted in the recess 50 about a cylindrical boss 52. The latter has a hole in its centre in which is secured an internally tapped sleeve 53 and the spring and pawl are retained in position by a retaining plate 54 (shown in broken lines) fixed to the boss 52 by a screw 54$a$ screwed into the sleeve 53. A recess 55 of identical shape to the recess 50 extends from the boss 52 towards the opposite side of the ratchet wheel 48 so as to permit mounting of the pawl on the opposite side if it is required to reverse the direction of rotation of the disc 44.

The shaft 2 is drilled axially from its left hand end with a deep, blind bore 57. Inserted in a small cross hole 58 in the shaft is a felt wick which receives an oil supply from a reservoir formed by the axial bore 57. This bore contains absorbent material for retaining oil and its open end may be closed by a plug 59 which is accessible via the cap 16. Oil is prevented from being thrown out from opposite ends of the bush 5 by the washer 25 and by a sealing washer 60, for example, a Teflon washer, which is urged into contact with the opposite end of the bush 5 by a compression spring 61 acting between the washer and the disc 44. The spring 61 is of just sufficient strength so as, in all positions of the reel, to be capable of supporting a fully loaded spool away from the friction disc 44 when the friction coupling is disengaged, whilst causing minimum frictional resistance to turning of the spool.

The fishing reel operates as follows. By screwing the shaft 2 and the gear nut 13 relative to one another, the shaft is moved axially. In this manner, the thrust bearing 28 can be moved towards or away from the thrust bearing 24 and the disc 44 is resiliently urged, through the springs 47, more or less strongly into engagement with the friction ring 45. When the friction coupling is engaged, turning of the winding handle 38 in a clockwise direction (as viewed from the right of the drawing) will rotate the spool to wind fishing line onto the spool. The winding handle cannot turn the spool in the opposite direction due to engagement of the pawl 49 and the ratchet wheel 48 preventing rotation of the disc 44 in a clockwise direction. However, the spool can rotate by itself in a clockwise direction and the pressure with which the disc 44 is urged against the friction ring 45 then determines the frictional braking force applied to the spool through the friction coupling. This braking force applies drag on the fishing line when it is being pulled-off the spool by a fish. The degree of drag can be adjusted by turning the shaft 2 with the aid of the lever 34 and by turning the knob 20. In order to allow for casting of the fishing line, the shaft 2 can be moved axially by adjustment of the lever and/or knob to a position where the friction coupling is disengaged so that the spool can free-wheel. Conveniently, the knob 20 is used to set the free-spool position of the range over which the friction coupling pressure can be quickly varied by the lever 34. During casting, overrunning of the spool is inhibited by the viscous drag of the film of oil between the shaft 2 and the bush 5.

Whilst a particular embodiment has been described, it will be appreciated that modifications can be made without departing from the scope of the invention. For example, the brake control lever 34 may be secured to the adjacent end of the shaft in any convenient manner and is not restricted to the construction specifically described above. Thus, instead of the disc 33, the lever may be formed with an integral circular flange at its end fixed to the shaft and be secured directly to the bush part 27. Moreover, the spring pad or cap 35 engaging the dimple in the off position of the control lever may be smaller than the other spring pad (or pads if more than two such springs are provided) so that only the predetermined spring will cooperate with the dimple in the off position.

I claim:

1. A fishing reel of the multiplying type, comprising:

A. first and second end housings consisting essentially of first and second plastic mouldings, respectively,
B. a shaft supported between said end housings,
C. means defining a bearing aperture for the shaft in said first end housing moulding, said shaft projecting through said bearing aperture to the outside of said first moulding and being journalled in said bearing aperture,
D. a screw thread formed on the projecting end of said shaft,
E. a nut screwed onto said projecting end in abutting relation with the outside of said first moulding,
F. a spool for fishing line rotatably mounted on said shaft between said end housings,
G. a friction coupling comprising first and second parts, said first coupling part being rotatably mounted on said shaft in opposing relation to said second part which is connected to said spool, said spool and friction coupling parts being arranged on said shaft so that axial adjustment thereof effects relative axial adjustment of said coupling parts for varying the friction coupling pressure,
H. a winding handle rotatably mounted on one of said end housings,
I. gear means coupling said winding handle to said first coupling part,
J. means resisting turning movement of said nut and shaft,
K. manually operable means for turning said shaft and nut relative to each other, whereby to effect said relative axial adjustment of said coupling parts, said manually operable means comprising lever means secured to the end of said shaft on the outside of said second end housing, and
L. at least one spring disposed in a cavity formed in said second end housing moulding, said spring bearing against said lever means and thereby resiliently urging said shaft in an axial direction away from said first end housing.

2. A fishing reel as claimed in claim 1, wherein:

A. said first end housing moulding has a recess formed on its outside about said projecting end of said shaft,
B. said nut is housed in said recess,
C. said recess is closed by cover means secured to said first end housing moulding,
D. gear teeth are provided about the periphery of said nut,
E. a pinion controlled by a knob mounted on the outside of said first end housing meshes with said gear teeth, whereby said nut may be turned relative to said shaft.

3. A fishing reel as claimed in claim 1, wherein:

A. said first end housing moulding has an inwardly projecting annular boss moulded on its inside about said shaft, B. first thrust bearing means is disposed about said shaft within said annular boss, said first thrust bearing means serving as an abutment for said spool,
C. said first coupling part is disposed adjacent said second end housing,
D. second thrust bearing means is connected to said shaft at said second end housing and serves as an abutment for said first coupling part.

4. A fishing reel as claimed in claim 1, including:
A. means for preventing said first coupling part from rotating in one direction comprising a ratchet wheel connected to rotate with said first coupling part and a cooperating pawl pivotally mounted on said second end housing moulding,
B. said second end housing moulding having similarly shaped recesses moulded therein and extending on opposite sides of said ratchet wheel,
C. said recesses terminating in cylindrical portions,
D. said pawl having a cylindrical boss portion pivoted in one of said cylindrical recess portions,
E. said pawl being urged into engagement with said ratchet wheel by spring means acting on said pawl.

5. A fishing reel as claimed in claim 1, wherein;
A. the end of said shaft at said second end housing is secured to a barrel member slidably and rotatably supported in bearing means in said second end housing moulding,
B. said bearing means is moulded integrally with said second end housing moulding,
C. said second end housing also has a bearing bush for a spindle of said winding handle moulded integrally therewith adjacent said bearing means.

6. A fishing reel of the multiplying type, comprising:
A. first and second end housings consisting essentially of first and second mouldings of rigid thermosetting plastics material, respectively,
B. a shaft supported between said end housings,
C. a spool for fishing line,
  i. said spool being rotatably mounted on said shaft between said end housings,
  ii. said spool having end flanges adjacent the insides of said end housing mouldings cooperating with ring means disposed on said mouldings to substantially enclose the insides of said mouldings with a minimal gap between said flanges and said ring parts,
D. means defining a bearing aperture for the said shaft in said first end housing moulding,
  i. said shaft projecting through said bearing aperture to the outside of said first end housing moulding and being journalled in said bearing aperture,
E. a screw thread formed on the projecting end of said shaft,
F. a nut screwed onto said projecting end in abutting relation with the outside of said first end housing moulding,
  i. said first end housing moulding having a recess moulded on its outside about said projecting end of said shaft,
  ii. said nut being housed within said recess which is closed by cover means,
  iii. said nut having gear teeth formed about its periphery,
  iv. manually adjustable gear means rotatably supported by said cover means and meshing with said gear teeth on said nut for turning said nut,
  v. means exerting a frictional force on said gear means resisting turning movement thereof and, hence, said nut,
G. a friction coupling comprising first and second coupling parts,
  i. said first coupling part being disposed adjacent said second end housing in opposing relation with said second coupling part which comprises friction material fixed to the adjacent end flange of said spool,
  ii. said spool and friction coupling parts being arranged on said shaft so that axial adjustment thereof effects relative axial movement of said coupling parts for varying the friction coupling pressure,
H. an inwardly projecting annular boss moulded on the inside of said first end housing moulding about said shaft,
I. a first thrust bearing housed within said boss and serving as an abutment for said spool,
J. a second thrust bearing connected to said shaft adjacent said second end housing,
  i. said second thrust bearing being adapted to urge said first coupling part towards said second coupling part,
  ii. said second thrust bearing being supported by a barrel member which is secured to the end of said shaft at said second end housing and is slidably and rotatably supported in first bearing means in said second end housing,
  iii. said first bearing means being moulded integrally with said second end housing moulding,
K. lever means secured to the outside end of said barrel member for turning said shaft,
L. compression springs disposed in cavities in said first bearing means beneath said lever means and acting on said lever means through friction pads,
M. a winding handle rotatably mounted on said second end housing,
N. second bearing means moulded integrally with said second end housing moulding adjacent said first bearing means and rotatably mounting a spindle of said winding handle,
O. a gear wheel secured to said spindle and meshing with a pinion secured to said first coupling part, and
P. means for preventing said first coupling part from rotating in one direction.

* * * * *